United States Patent [19]
Breslich, Jr. et al.

[11] Patent Number: 4,991,462
[45] Date of Patent: Feb. 12, 1991

[54] FLEXIBLE COMPOSITE ULTRACENTRIFUGE ROTOR

[75] Inventors: Francis N. Breslich, Jr.; John H. Laakso, both of Seattle, Wash.

[73] Assignee: E. I. Du Pont de Nemours and Company, Wilmington, Del.

[21] Appl. No.: 805,709

[22] Filed: Dec. 6, 1985

[51] Int. Cl.[5] .......... G05G 1/00; F16F 15/22
[52] U.S. Cl. .......... 74/572; 74/573 R; 494/16
[58] Field of Search .......... 74/572, 573; 494/16, 494/81, 82

[56] References Cited

U.S. PATENT DOCUMENTS

| | | | |
|---|---|---|---|
| 477,324 | 6/1892 | Coburn | 74/572 |
| 1,906,925 | 5/1933 | Edwards | 74/574 |
| 3,361,343 | 1/1968 | Lerner | 233/26 |
| 3,602,066 | 8/1971 | Wetherbee | 74/572 |
| 3,602,067 | 8/1971 | Wetherbee | 74/572 |
| 3,964,341 | 6/1976 | Rabenhorst | 74/572 |
| 3,982,447 | 9/1976 | Rabenhorst | 74/572 |
| 4,023,437 | 5/1977 | Rabenhorst | 74/572 |
| 4,036,080 | 7/1977 | Friedericy et al. | 74/572 |
| 4,093,118 | 6/1978 | Sinn et al. | 26/233 |
| 4,102,220 | 7/1978 | Brobeck | 74/572 |
| 4,116,018 | 9/1978 | Weible | 64/12 |
| 4,123,949 | 11/1978 | Knight, Jr. et al. | 74/572 |
| 4,176,563 | 12/1979 | Younger | 74/572 |
| 4,183,259 | 1/1980 | GioVachini et al. | 74/572 |
| 4,187,699 | 2/1980 | Weible | 64/12 |
| 4,198,878 | 4/1980 | Lewis et al. | 74/572 |
| 4,207,755 | 6/1980 | Weible | 64/27 B |
| 4,207,778 | 6/1980 | Hatch | 428/68 |
| 4,244,240 | 1/1981 | Rabenhorst | 74/572 |
| 4,266,442 | 5/1981 | Zorzi | 74/572 |
| 4,285,251 | 8/1981 | Swartout | 74/572 |
| 4,327,661 | 5/1982 | Boeckel | 494/16 X |
| 4,341,001 | 7/1982 | Swartout | 29/159.3 |
| 4,359,912 | 11/1982 | Small | 79/572 |
| 4,370,899 | 2/1983 | Swartout | 74/572 |
| 4,375,272 | 3/1983 | Sutton | 494/16 |
| 4,408,500 | 10/1983 | Kulkarni et al. | 74/572 |
| 4,443,727 | 4/1984 | Annen et al. | 74/572 X |
| 4,449,965 | 5/1984 | Strain | 494/16 |
| 4,451,250 | 5/1984 | Romanauskas | 494/16 X |
| 4,458,400 | 7/1984 | Friedericy et al. | 29/159.3 |
| 4,460,351 | 7/1984 | Wakita et al. | 494/16 |
| 4,468,269 | 8/1984 | Carey | 156/175 |
| 4,481,840 | 11/1984 | Friedericy et al. | 74/572 |
| 4,502,349 | 3/1985 | Abiven et al. | 74/572 |
| 4,553,955 | 11/1985 | Lam et al. | 494/16 |
| 4,589,864 | 5/1986 | Cole | 494/20 |
| 4,675,001 | 6/1987 | Johanson | 494/85 |

FOREIGN PATENT DOCUMENTS

| | | | |
|---|---|---|---|
| 0081968 | 6/1983 | European Pat. Off. . | |
| 513713 | 12/1930 | Fed. Rep. of Germany . | |
| 957046 | 1/1957 | Fed. Rep. of Germany | 74/572 |
| 2741603 | 3/1978 | Fed. Rep. of Germany . | |
| 2538719 | 7/1984 | France . | |
| 57-6143 | 1/1982 | Japan . | |
| 57-195945 | 12/1982 | Japan | 74/572 |
| 58-30548 | 2/1983 | Japan | 74/572 |
| 5512943 | 5/1985 | Japan . | |
| 794277 | 1/1981 | U.S.S.R. | 74/572 |
| 1174615 | 8/1985 | U.S.S.R. | 74/572 |
| 23742 | of 1898 | United Kingdom | 74/572 |
| 0505446 | 5/1939 | United Kingdom . | |
| 2097297 | 11/1982 | United Kingdom . | |

OTHER PUBLICATIONS

Patent Abstract of Japan, vol. 7, No. 110, (M-214), (1255), May 13, 1983.

*Primary Examiner*—Rodney M. Lindsey

[57] ABSTRACT

An ultracentrifuge rotor is characterized by a hub having radially outwardly extending curved spokes. The outer ends of the spokes are received in a groove defined on the inner peripheral surface of an annular rim. Sample carriers are affixed to the rim at circumferentially spaced locations defined between adjacent pairs of spokes. As the rotor rotates the disparity in physical properties between the hub and the rim as well as the flattening of the curvature of the spokes causes the hub to grow to an extent at least equal to that of the growth of the rim.

15 Claims, 5 Drawing Sheets

FLEXIBLE COMPOSITE ULTRACENTRIFUGE ROTOR

BACKGROUND OF THE INVENTION

1. Field of the Invention

This invention relates to an ultracentrifuge rotor and, in particular, to an ultracentrifuge rotor having a central flexible web fabricated of a composite material and surrounded by an annular rim.

2. Description of the Prior Art

In order to increase centrifugal load carrying capability the manufacture of rotating structures has evolved from the use of homogeneous materials such as aluminum and titanium toward the use of composite materials. The use of such composite materials has become especially apparent in the area of flywheel energy storage structures. Exemplary of energy storage structures using composites are U.S. Pat. No. 4,481,840 (Friedericy et al, a flywheel having elastic spokes carrying an elastic rim), U.S. Pat. No. 4,408,500 (Kulkarni et al, a flywheel body enclosed by a circumferentially wound fiber rim), U.S. Pat. No. 4,370,899 (Swartout, a flywheel having glass surrounded by a fiber rim), U.S. Pat. No. 4,266,442 (Zorzi, a flywheel with cross-ply composite core in relatively thick rim), and U.S. Pat. No. 4,207,778 (Hatch, reinforced cross-ply composite flywheel).

It is believed advantageous to obtain the benefits attendant with the use of a composite structure in fabricating ultraspeed centrifuge rotors.

SUMMARY OF THE INVENTION

The present invention relates to an ultracentrifuge rotor having a central hub and an annular rim surrounding the same. Both the hub and the rim are formed as composite structures each having a set of predetermined physical properties associated therewith which define the stiffness of these members. The hub is formed as a laminate of multiple laminae which overlap each other to define a central body portion and an array of radially outwardly extending curved spokes. The ends of the spokes are received in a groove provided on the inner surface of the annular rim. An array of individual sample carriers is carried by the rim. The sample carriers are each adhesively bonded to the inner surface of the rim circumferentially between each pair or spokes emanating from the hub to the rim.

At rest the radially outer ends of the spokes are curved upwardly or downwardly with respect to a horizontal reference datum generally lying coincident with the body portion or the plane of the rim. At rotational speed the hub and the rim both deflect, or grow, radially outwardly. The growth of the hub is at least equal to the growth of the rim. The growth of the hub is due to the combination of the deflection caused by the stiffness of the hub and the geometric deflection caused by the flattening of the curvature of the spokes. By judiciously selecting the magnitude of the growth of the hub with respect to that of the rim the ends of the spokes may be caused to more intimately engage themselves into the groove provided on the inner surface of the rim.

BRIEF DESCRIPTION OF THE DRAWINGS

The invention will be more fully understood from the following detailed description thereof taken in connection with the accompanying drawings which form a part of the application and in which.

DETAILED DESCRIPTION OF THE INVENTION

Throughout the following detailed description similar reference numbers refer to similar elements in all figures of the drawings.

Figure 1:
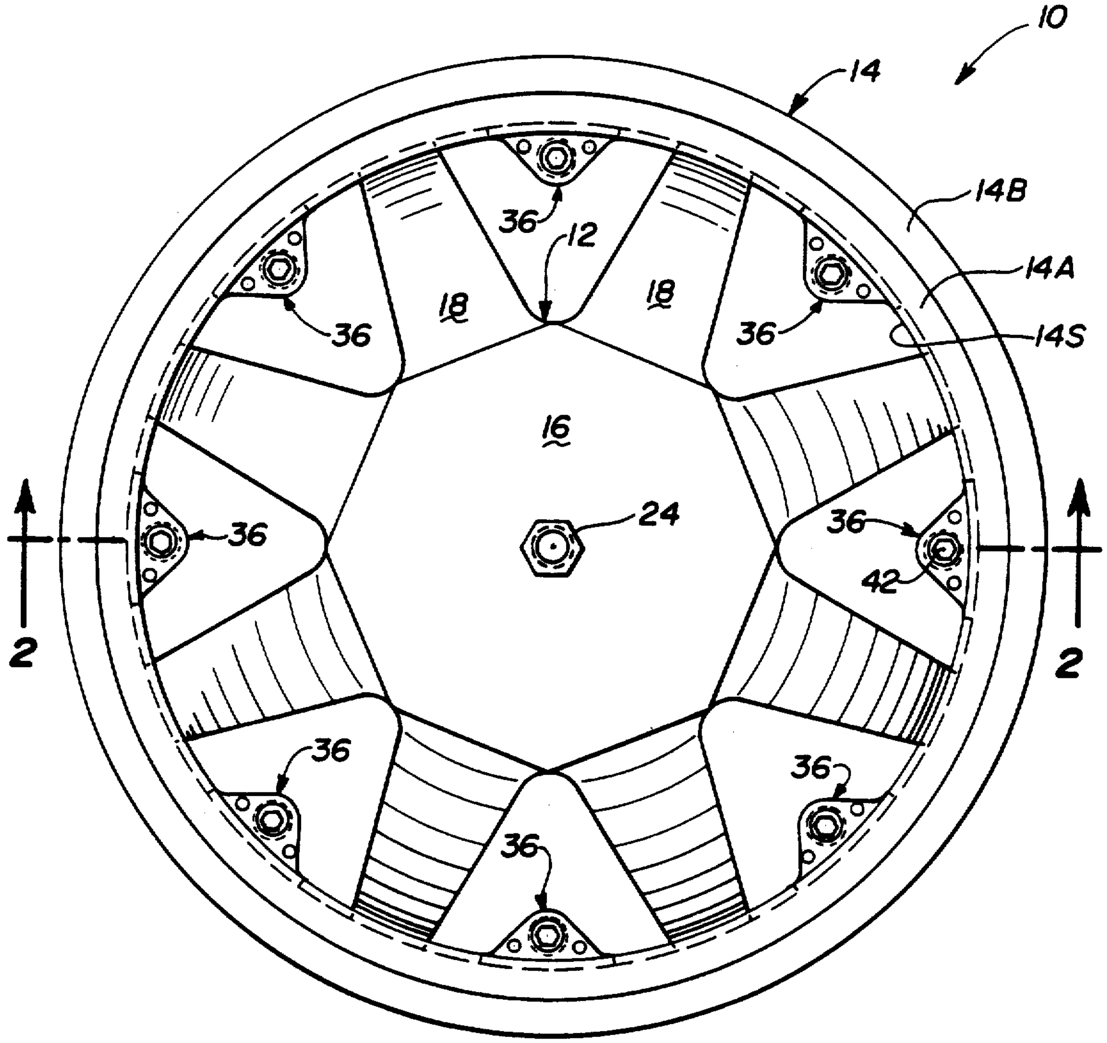
FIG. 1 is a plan view of an ultracentrifuge rotor in accordance with the present invention.
Figure 2:
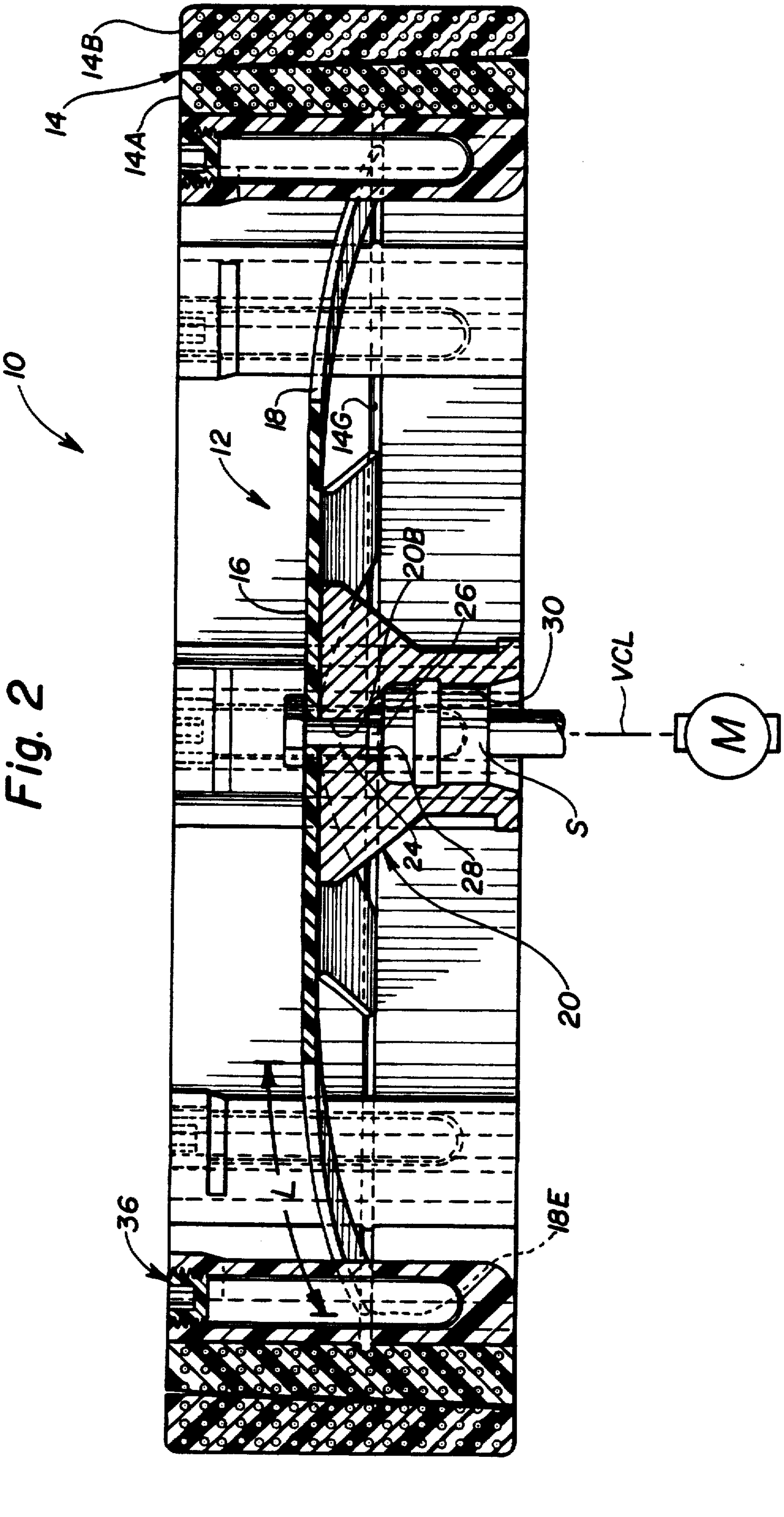
FIG. 2 is a side-sectional view taken along section lines 2—2 in FIG. 1.

With reference to FIGS. 1 and 2 an ultracentrifuge rotor generally indicated by reference character 10 includes a central member, or hub, 12 surrounded by an annular rim 14. The hub 12 is a relatively thin flexible member formed in a manner to be discussed from a plurality of laminae of composite materials.

The hub 12 comprises a central body portion 16 and a plurality of radially outwardly extending curved spokes 18. The body portion 16 of the hub 12 is generally planar across its diametrical dimension while the upper edge of the rim 14 also generally lies in a plane parallel to the body 16. The spokes 18 are curved either upwardly or downwardly with respect to the plane of the rim 14 and with respect to the planar body portion 16. The spokes 18 have a predetermined length L and a predetermined radius of curvature R. As will be developed more fully herein the magnitude of the length L and the radius of curvature R define the magnitude of the geometric deflection that the spokes 18 undergo as the rotor 10 is rotated to speed.

The hub 12 is connected to a mounting member 20 (FIG. 2) by a bolt 24 that passes through a central bore 20B in the member 20. A nut 26 threads onto the bolt 24 within a recess 28 on the underside of the member 20. Also provided on the underside of the member 20 is a drive recess 30 adapted to receive the mounting spud S of a conventional centrifuge drive whereby the rotor 10 may be interconnected to a source M of motive energy for rotation about a vertical axis of rotation VCL. The mounting member 20 is adhesively bonded to the lower surface of the body portion 16 of the hub 12. Any suitable adhesive may be used so long as the adhesive is sufficiently flexible to allow both the body portion 16 and the member 20 to grow at their own rates.

The rim 14 is an annular member formed, in the preferred case, from a plurality of nested rings of which two such rings, 14A and 14B, are shown. Each ring is fabricated by winding a carbon or graphite fiber coated with epoxy on a suitable mandril. The rings are interference fit onto each other. The inner surface of the inner ring 14A is provided with a circumferential groove 14G. In its assembled condition the radially outward ends 18E of the spokes 18 project in a driving relationship into the groove 14G. It shoudl be understood that the rim 14 may also be wound as an integral member or may be provided by any other convenient fabrication method and remain within the contemplation of this invention.

The set of physical properties of the rim 14 serves to determine the magnitude to which the rim would deflect radially outwardly due to various applied forces. These properties may collectively be termed the "stiffness" of the rim. Similarly, the set of physical properties of the hub which serves to determine the magnitude to which it deflects radially outwardly may be termed the "stiffness" of the hub. Those skilled in the art readily recognize the various physical properties which contribute to the stiffness of the hub and the rim. For example, modulus of elasticity, density, cross sectional area, and radius help determine the stiffness of a member such as the rim or hub. The applied forces to these members may derive from centrifugal force, body load, or preload, for example. Both the hub and the rim deflect due to the stiffness of these members. In addition the hub also has a component of growth due to the geometric deflection of the spokes, as will be discussed.

Figure 3A:
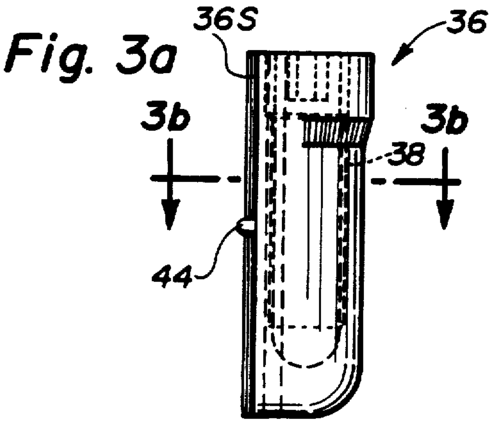
FIGS. 3A and 3B are a side elevation view and a sectional view, respectively, of a sample carrier useful with the rotor shown in FIGS. 1 and 2.
Figure 3B:
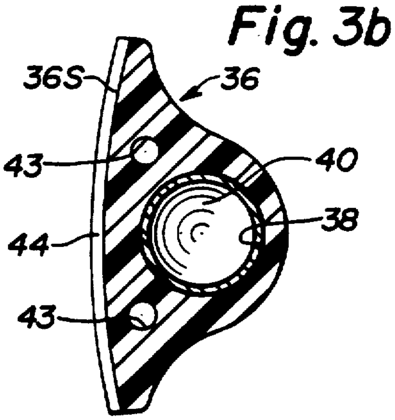

Samples under test are carried in sample carriers 36 which in the preferred case are fabricated from thermosetting or thermoplastic materials reinforced by chopped graphite fiber material. The sample carriers are generally elongated cylindrical members having an opening 38 provided therein. One embodiment of the carrier 36 is seen in FIGS. 3A and 3B. In the embodiment of FIGS. 3A and 3B the opening 38 is in the form of a generally cylindrical enclosed recess. The recess is sized to receive a suitable sample container 40. A suitable cap 42 may be provided, if desired (FIG. 2). The radially outer surface 36S of the sample carrier is contoured to conform to the curvature of the inner peripheral surface 14S of the rim 14. A projecting key 44 is provided on the radially outer surface 36S of the carrier 36. As best seen in FIGS. 1 and 2 each carrier 36 is mounted to the inner peripheral 14S of the rim 14 in those circumferential gaps defined between circumferentially adjacent pairs of the radially projecting spokes 18. When mounted the key 44 on the carrier 36 projects into the groove 14G disposed on the inner peripheral surface of the rim 14. The carriers 36 are adhesively secured to the rim 14. The carrier 36 is also provided with weight reducing cutouts 43.

Figure 4A:
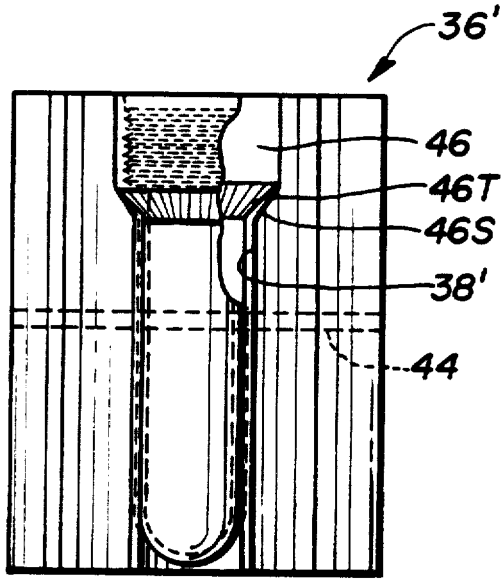
FIGS. 4A and 4B are, respectively, a front elevation view and a top view of an alternate embodiment of a sample carrier.
Figure 4B:
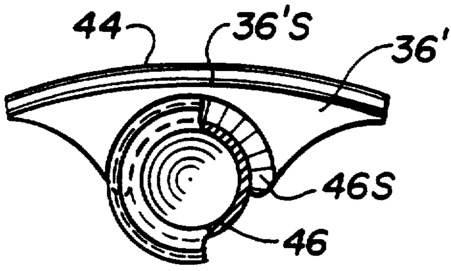

An alternative form of the sample carrier 36 is shown in FIGS. 4A and 4B. In this embodiment the carrier takes the form of a saddle member 36' and the opening 38' takes the form of an open slot therein. The slot is contoured to receive a titanium container 46. The container 46 carries a taper 46T which seats against a correspondingly tapered surface 46S in the saddle. The outer surface 36'S corresponds to the shape of the inner peripheral surface 14S of the innermost ring which forms the rim 14.

Figure 5A:
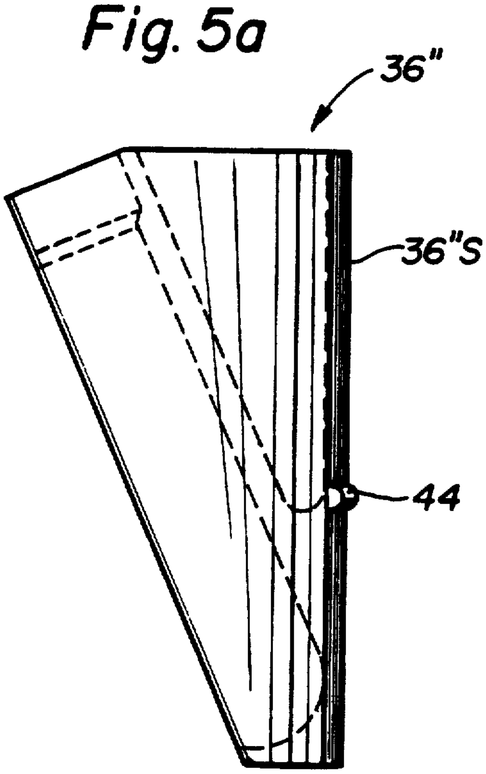
FIGS. 5A and 5B are, respectively, a side elevation view and a top view of another alternate embodiment of a sample carrier.
Figure 5B:
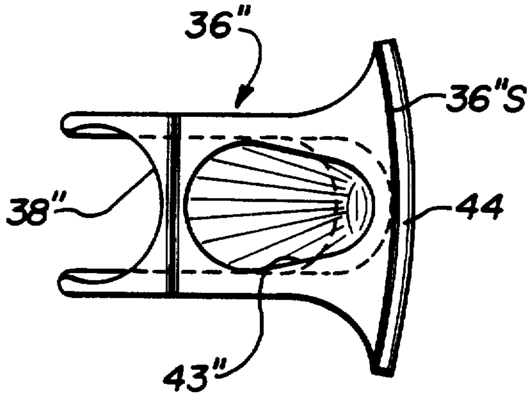

In FIGS. 3 and 4 the carriers 36, 36' are so-called vertical carriers in that the axes of the opening (i.e., the recess or the slot) lies parallel to the axis of rotation of the rotor. In FIGS. 5A and 5B an alternative embodiment of the carrier is shown. In this embodiment the saddle 36" includes a slot in which the axis thereof is inclined with respect to the axis of rotation VCL. A suitable container (not shown) is slidably receivable therein. A weight-reducing cutout 43" is provided in the saddle 36". The external surface 36"S of the saddle 36" is configured similarly to that discussed above.

The carriers, however formed and configured, in addition to holding the sample, also function to distribute their mass and the mass of the sample to the rim 14. The carriers are shaped in a manner which distributes these masses as uniformly as possible. To this end, the surface 36S', 36'S' and 36"S' are configured as shown in the Figures.

Figure 6:
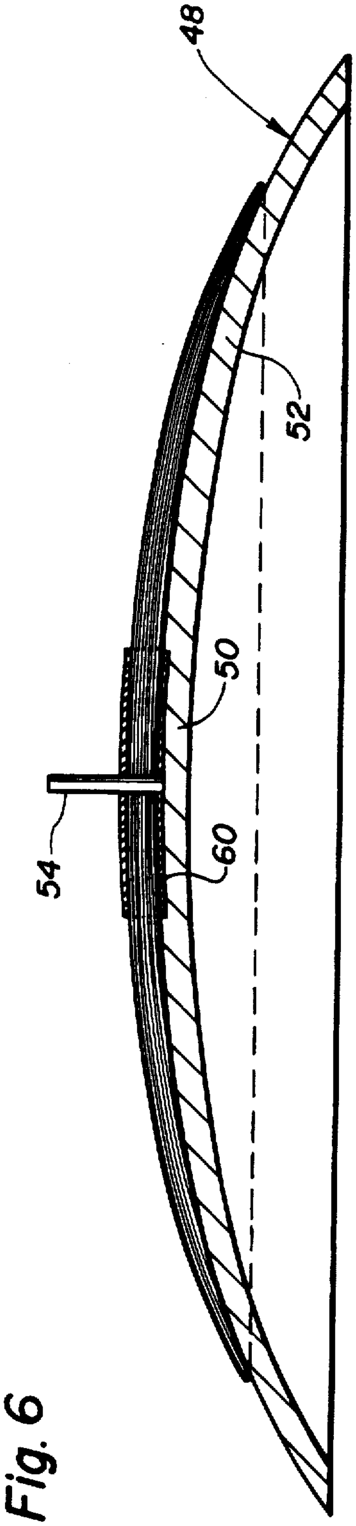
FIG. 6 is a side elevational view of a lay-up tool used in fabrication of the spoked hub for the rotor in accordance with the present invention.

The hub 12 is fabricated using a lay-up tool 48 such as that disclosed in FIG. 6. The lay-up tool 48 has a generally planar central portion 50 surrounded by a substantially spherically contoured portion 52. A central post 54 projects upwardly from the central portion 50. The hub 12 is formed by layering a predetermined plurality of epoxy coated fiber laminae 56 and 58 onto the lay-up tool 48. Representative laminae 56 and 58 are shown respectively in FIGS. 7 and 8.

Figure 7:
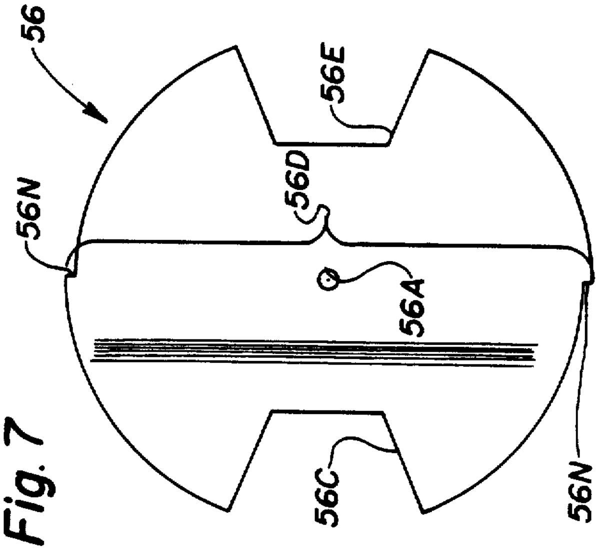

As seen from FIG. 7 the lamina 56 is substantially circular in shape with each of the fibers forming the lamina 56 extending parallel to the other. The lamina 56 is provided with diametrically opposed segment shaped cut-outs 56C. Notches 56N are provided on the laminate 56 approximately ninety degrees from each of the cut-outs. The radial edges of the notches 56N align with the direction of the axes of the fibers in the laminates 56. The lamina have a predetermined diametrical dimension 56D.

Figure 8:
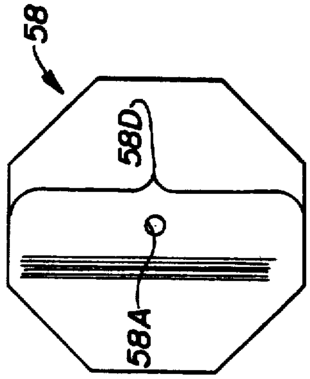
FIGS. 7 and 8 are plan views of representative laminae used in fabricating the rotor in accordance with the present invention.

The lamina 58 has a generally polygonal shape such as indicated in FIG. 8.The number of sides of the polygon corresponds to the number of spokes 18 provided on the rotor 10. The fibers which form the lamina 58 are arranged with their axes parallel to each other and with the daimetrical direction 58D of the lamina 58. Both the laminates 56 and 58 are provided with a central aperture 56A and 58A, respectively.

During fabrication the laminae 56, 58 are positioned on the lay-up tool 48 such that the axes of the fibers in each lamina are angularly off-set by a predetermined amount from the axis of the fibers of the vertically adjacent laminae. In the preferred case the hub 12 is fabricated by providing a lower peel-ply 60; that is, a circular member having a central aperture, on the post 54 of the lay-up tool 48. Thereafter, laminae 56, 58 are layered atop the lay-up tool by inserting a central aperture 56A, 58A onto the post 54. Any preferred vertical order of laminae and any preferred angular orientation may be followed so that the laminae are preferably vertically layered in a symmetric manner. "Symmetric" is meant to convey the idea that the orientation of the axes of the fibers in the laminae above a central lamina is mirrored in the orientation of the axes of the fibers in the laminae below that central lamina. The angular orientation of each lamina is defined with respect to a reference direction defined by the fibers of the first lamina. Thus, for example, the axes of the fibers in the first lamina define a zero degree position against which the angular displacement of the axes of subsequent laminae may be measured. After layering, the laminae are cured at suitable temperature and under suitable pressure conditions.

After curing the hub is removed from the lay-up tool and the various spokes 18 are defined by cutting away excess material. The sequence by which the laminae 56, 58 are laid down is designed to control the stiffness of the hub 12. The cutouts 56C are arranged to facilitate the removal of the material to define the spokes 18. Since the overlap of the radially outer portions of the spokes 18 are defined by the circular laminae 56 while the body 16 is defined by the cooperative overlap of the central part of the lamina 56 with the lamina 58 the body portion 16 is more stiff than the spokes 18.

The rings which form the corresponding rim 14 are wound on any suitable mandril. Interfacing surfaces of the rings are slightly tapered to enhance the interference fit therebetween. The rim 14 so formed provided with the groove 14G. The hub 12 and the rim 14 are joined by moving the annular rim 14 in the direction parallel to the axis of rotation with respect to the spoked hub such that the radially outer ends 18E of the spokes snap into the groove 14G. Any suitable number of rings may be used.

Figure 9A:
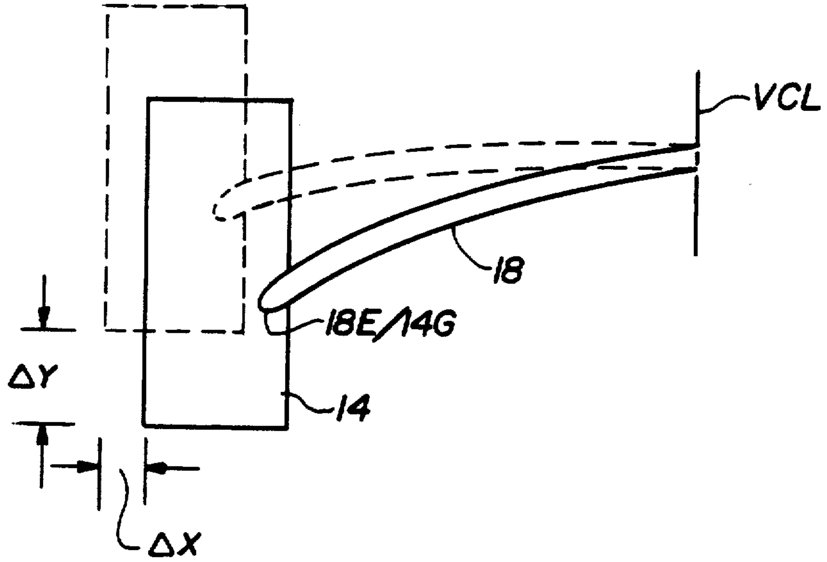
FIGS. 9A and 9B are stylized diagrams illustrating the deflections of the rotor as it rotates to speed.
Figure 9B:
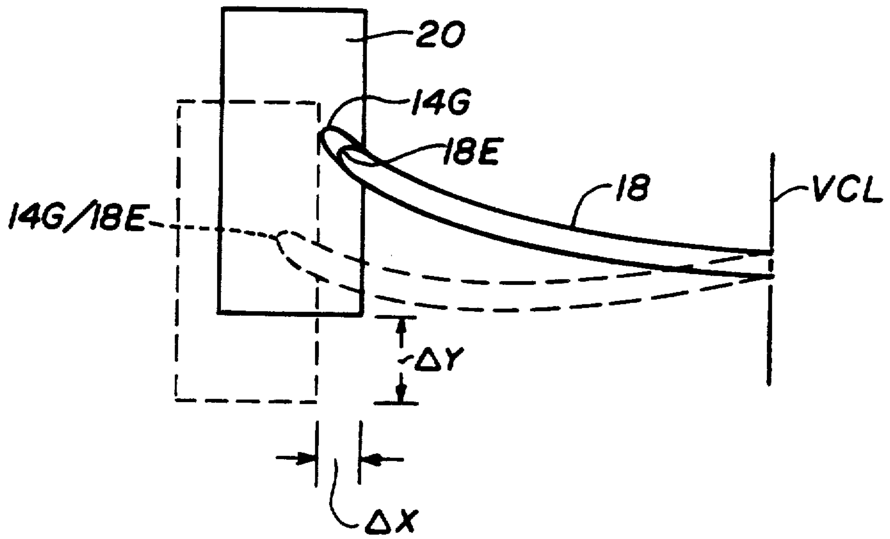

The operation of the rotor in accordance with the present invention may be understood by reference to FIGS. 9A and 9B. In FIG. 9A the situation wherein the growth of the hub 12 is at least equal to that of the rim 14 is illustrated. In this FIG. 9A in the rest position (solid line) the ends 18E of the spokes 18 are closely received within the groove 14G on the rim 14. At a predetermined speed the rim 14 and the hub 12 deflect a predetermined radial distance $\Delta X$ and are lifted a predetermined vertical distance $\Delta Y$. The magnitude of the growth of the hub 12 is at least equal to that of the rim 14, as may be seen from the same relative position of the ends 18E of the spokes 18 within the groove 14G. The deflection of the hub is due to both the material deflection due to the physical properties of the hub and to the geometric deflection imparted by the geometric properties, i.e., the length L and radius of curvature R, of the spokes 18. Judicious selection of these various parameters as well as the magnitude of any preload between the rim and the hub, may also be used to affect the force that the spokes 18 impose on the rim. The point to note is that the total deflection of the hub from the combination of the material deflection and the geometric deflection must at least equal the deflection of the rim to maintain the hub in driving engagement with the rim.

FIG. 9B illustrates an instance in which the deflection of the hub is greater than than of the rim. The increased deflection is accommodated by the geometry of the groove 14G, and is manifested in FIG. 9B by the difference in the magnitude of the gap between the hub and rim in the rest and at-speed (dotted line) cases. The spokes 18 are curved upwardly in FIG. 9B.

It will be readily appreciated by those with skill in the art that some provision may have to be made in order to prevent circumferential slippage between the rim and spokes when these members experience differential torques, as when the rotor is accelerated.

Those skilled in the art having the benefit of the teachings of the present invention as hereinabove set forth may effect numerous modifications thereto. These modifications are to be construed as lying within the contemplation of the present invention as set forth in the appended claims.

WHAT IS CLAIMED IS:

1. A centrifuge rotor comprising:
   - an annular rim having a circumferential groove disposed on the radially inner surface thereof, the rim having a first predetermined stiffness associated therewith;
   - a hub formed of a plurality of laminae, the hub having a central body portion and an array of radially outwardly extending curved spokes, the radially outer ends of each of the spokes being received in driving relationship within the groove disposed on the inner peripheral surface of the rim, the hub having a second predetermined stiffness associated therewith;
   - an array of sample carriers mounted to the rim at circumferential locations thereon defined between adjacent pairs of spokes; and
   - the rotor being rotatable to a predetermined rotational speed whereby centrifugal force acts on the hub and the rim to cause them to grow radially outwardly due to the disparity in stiffness and to the flattening of the curved portion of the spokes, the growth of the hub being at least equal to that of the rim.

2. The rotor of claim 1 wherein the spokes curve upwardly relative to the plane of the central body portion.

3. The rotor of claim 1 wherein the spokes curve downwardly relative to the plane of the central body portion.

4. The rotor of claim 1 wherein each sample carrier comprises a member having a sample receiving opening therein, one surface of the member being shaped in correspondence to the shape of the inner surface of the rim, the surface having a projection threon sized for close fitting receipt in the groove in the rim, the carrier being configured to substantially uniformly distribute its mass and the mass of a sample receivable therein to the rim.

5. The rotor of claim 2 wherein each sample carrier comprises a member having a sample receiving opening therein, one surface of the member being shaped in correspondence to the shape of the inner surface of the rim, the surface having a projection thereon sized for close fitting receipt in the groove in the rim, the carrier being configured to substantially uniformly distribute its mass and the mass of a sample receivable therein to the rim.

6. The rotor of claim 3 wherein each sample carrier comprises a member having a sample receiving openeing therein, one surface of the member being shaped in correspondence to the shape of the inner surface of the rim, the surface having a porjection thereon sized for close fitting receipt in the groove in the rim, the carrier being configured to substantially uniformly distribute its mass and the mass of a sample receivable therein to the rim.

7. The rotor of claim 4 wherein the member has at least one cutout formed therein.

8. The rotor of claim 5 wherein the member has at least one cutout formed therein.

9. The rotor of claim 6 wherein the member has at least one cutout formed therein.

10. The rotor of claim 4 wherein the axis of the sample receiving opening is parallel to the axis of rotation of the rotor.

11. The rotor of claim 5 wherein the axis of the sample receiving opening is parallel to the axis of rotation of the rotor.

12. The rotor of claim 6 wherein the axis of the sample receiving opening is parallel to the axis of rotation of the rotor.

13. The rotor of claim 4 wherein the axis of the sample receiving opening is inclined with respect to the axis of rotation of the rotor.

14. Thr rotor of claim 5 wherein the axis of the sample receiving opening is inclined with respect to the axis of rotation of the rotor.

15. The rotor of claim 6 wherein the axis of the sample receiving opening is inclined with respect to the axis of rotation of the rotor.

* * * * *